US010902409B2

(12) United States Patent
Lee (10) Patent No.: US 10,902,409 B2
(45) Date of Patent: Jan. 26, 2021

(54) METHOD AND SYSTEM FOR CARD PAYMENT APPROVAL USING MOBILE TERMINAL OF MOBILE CARD HOLDER

(71) Applicant: Sung Won Lee, Gyeonggi-do (KR)

(72) Inventor: Sung Won Lee, Gyeonggi-do (KR)

( * ) Notice: Subject to any disclaimer, the term of this patent is extended or adjusted under 35 U.S.C. 154(b) by 119 days.

(21) Appl. No.: 16/303,809

(22) PCT Filed: Jul. 11, 2017

(86) PCT No.: PCT/KR2017/007376
§ 371 (c)(1),
(2) Date: Nov. 21, 2018

(87) PCT Pub. No.: WO2018/012836
PCT Pub. Date: Jan. 18, 2018

(65) Prior Publication Data
US 2020/0250651 A1 Aug. 6, 2020

(30) Foreign Application Priority Data
Jul. 13, 2016 (KR) ........................ 10-2016-0088462

(51) Int. Cl.
*G06K 7/08* (2006.01)
*G06Q 20/32* (2012.01)
(Continued)

(52) U.S. Cl.
CPC ..... *G06Q 20/3276* (2013.01); *G06Q 20/3223* (2013.01); *G06Q 20/341* (2013.01); *G06Q 20/4012* (2013.01)

(58) Field of Classification Search
CPC ........ G07F 7/1008; G07F 7/08; G06Q 20/341
(Continued)

(56) References Cited

U.S. PATENT DOCUMENTS

2015/0066768 A1* 3/2015 Williamson ....... G06Q 20/4097
705/44
2017/0323297 A1* 11/2017 Shanmugam ........ G06Q 20/223
(Continued)

FOREIGN PATENT DOCUMENTS

JP         5946441 B2      7/2016
KR     1020120074497 A    7/2012
(Continued)

OTHER PUBLICATIONS

International Search Report; dated Oct. 13, 2017 for PCT Application No. PCT/KR2017/007376.

*Primary Examiner* — Ahshik Kim
(74) *Attorney, Agent, or Firm* — Mendelsohn Dunleavy, P.C.

(57) ABSTRACT

The present invention relates to a system and a method for requesting approval of a card payment and processing a calculation, by using a mobile terminal of a mobile card holder, wherein: in payment information exchange between a calculation terminal operated by a merchant and a mobile terminal of a card holder, when a display device of the store calculation terminal displays a two-dimensional bar code including information, such as payment details, without wired or wireless data communication connection, payment detail information is conveniently and safely transmitted through simply photographing the two-dimensional bar code by using a camera module built in the mobile terminal of the card holder; and a request for approval of a card payment is finally achieved using the mobile terminal of the card holder, thereby improving convenience of using mobile payment service through easy and safe payment without providing card information of a card holder to the outside.

5 Claims, 8 Drawing Sheets

(51) Int. Cl.
*G06Q 20/34* (2012.01)
*G06Q 20/40* (2012.01)

(58) Field of Classification Search
USPC .......................................... 235/380
See application file for complete search history.

(56) References Cited

U.S. PATENT DOCUMENTS

2018/0032996 A1\* 2/2018 Phillips .................. G06Q 20/36
2018/0137272 A1\* 5/2018 Kamal ................. G06F 21/6254
2020/0065819 A1\* 2/2020 Gonzalez ......... G06Q 20/40145
2020/0097959 A1\* 3/2020 Tran ................... G06Q 20/3821

FOREIGN PATENT DOCUMENTS

| KR | 1020120100283 A | 9/2012 |
| KR | 101309749 B1 | 9/2013 |
| KR | 1020150132944 A | 11/2015 |

\* cited by examiner

METHOD AND SYSTEM FOR CARD PAYMENT APPROVAL USING MOBILE TERMINAL OF MOBILE CARD HOLDER

TECHNICAL FIELD

The present invention relates generally to a system and method for a commercial payment service using a mobile financial card stored and used in a mobile terminal of a merchandise purchaser. More particularly, the present invention relates to a point-of-sale (POS) system used for commercial payment by a merchant, a mobile terminal and mobile application program that enables storing and use of mobile financial card information of a card holder, and a credit card verifying service system that collects card payment approval request information created through commercial transaction and transmits the same to a card payment network system and a bank server system.

BACKGROUND ART

In a card calculation environment in the related art, when performing commercial transaction using a financial card such as a credit card, card information such as a card number, a personal identification number (PIN), and the like, and financial information of the card holder are transmitted to the external card approval system and a bank server system through a card reader terminal provided in a store. Since such information plays a very important role in the payment process for withdrawal and remittance of funds according to financial transactions using a card, financial companies such as financial institutions, banks, and card companies have taken various measures to ensure the security and confidentiality of such information during financial transactions using the card.

In order to secure the card information and the financial information of the card holder during the payment process using the card, as representative methods, the financial institutions employ a method of using a card reader terminal authenticated by a standardization organization related to the security of card payment process, such as Europay-Mastercard-Visa (EMV), Payment Card Industry (PCI) Security Standards, and the like, in addition to a method of advising the card holder to keep the confidentiality of his/her card information.

However, due to the advancement of IT technology and the advancement of payment services, as service has been developed whereby financial cards such as mobile cards do not take physical shape as in the case of plastic cards in the related art, but are stored and used in the form of data on the user mobile terminal such as a smart phone, a likelihood that the card information may be leaked due to a smart phone hacking or a virus program may be increased, whereby it is not possible to guarantee the security of the card information only by the card holder's personal financial information security and the use of the card reader terminal with EMV/PCI authentication in the store.

In order to secure the card information stored on the mobile terminal of the card holder in the form of data from such security risk, security standardization organizations such as EMV and PCI recommend the use of tokenization technology, which has been widely used in mobile payment service.

In the tokenizing technique, when a card holder stores credit card information in a form of data in a mobile terminal used by the card holder, and then transmits the stored card information to the card token service system, the card token service system uses the transmitted card information to generate a card token and then transmit the same to a mobile terminal of the card holder. Hereafter, the card holder uses the card token instead of actual card information when performing commercial transaction using the mobile card. The card token has the update period of the card token information arbitrarily set according to the operation policy. Because of the operation characteristics of the card token, the card token may be understood as a kind of disposable temporary card number.

In order to use a mobile card in a mobile card payment environment in the related art, an RFID/NFC reader or a bar code scanner must be connected to a card reader of a store. A mobile terminal having mobile card stored therein is brought close to the card reader provided with such equipment or a bar code containing card information is displayed on the mobile terminal, and then card information is read by a store card reader terminal through a bar code reader. Some mobile terminals use a technology called magnetic secure transmission (MST) to provide a technology capable of using a mobile card by using a general card reader with which the store has already provided with. However, this MST technology is a technology that a particular company has an exclusive license to use.

In addition, the card payment approval request information created using the payment details and card information in the card reader terminal is automatically transmitted to the credit card verifying service system (value added network (VAN) in Korea, and payment gateway (PG) in the other foreign countries). When the card reader terminal is installed in the store, the card reader terminal information must first be registered in the credit card verifying service system and then used. Through the registration, the card reader terminal is provided such that the card payment approval request information is automatically transmitted to the credit card verifying service system.

In addition, a two-dimensional bar code represented by QR code is used as a method of transmitting calculation detail information from a store calculation terminal to a customer mobile terminal according to the present invention. Such two-dimensional bar code technology is to facilitate convenient retrieval of Internet information, in such a manner as to be automatically connected to an Internet address that a two-dimensional bar code contains, by photographing a two-dimensional bar code printed on various printing medium using a camera built in the mobile terminal in which the QR code maximally contains 7089 number characters, 4296 alphanumeric characters, 2953 8-bit bytes, and 1817 Chinese characters.

DISCLOSURE

Technical Problem

Through the use of encryption or security technology such as tokenization technology, an environment is realized whereby a mobile card can be used safely. The emergence of services such as mobile card payment is a positive change in terms of the improved convenience of card users, but it is not welcomed because it means additional investment to support new card payment technology in addition to an existing card payment environment for merchants and card-payment service providers who need to support new payment methods. In particular, in order to provide a mobile card payment service, small-scale merchants have the burden of investing in expensive equipment such as a bar code scanner or an NFC/RFID reader so that they may use the mobile card, in addition to the card payment reader terminal that can use only an existing plastic card type.

In particular, the use of EMV/PCI authentication card reader terminal that is required to be used in order to protect card-based financial transaction information is effective in protecting sensitive personal card information. However, it is one of the biggest burdens for merchants and card payment service providers who must purchase/supply expensive card reader terminals with EMV/PCI authentication. Also, it is very difficult to modify the terminal according to the new type of card payment service, because it is strictly restricted to change the software and hardware of the terminal for the card reader terminal with EMV/PCI authentication. For this reason, there are a lot of limitations in supporting a new type of card payment service in the existing card payment system.

In order to overcome the burden of establishing and maintaining a card payment environment of a merchant and a financial company, which is caused due to the use of a card payment service system on the basis of a card reader terminal with EMV/PCI authentication in the related art, an object of the present invention is to provide a system and method for providing a more secure and convenient mobile card payment service than the payment service system in the related art, by enabling the mobile terminal of the card holder to be used as a disposable temporary card reader terminal so that important information such as the card holder's information and personal information can be transmitted directly to the credit card verifying service system without going through an external terminal or system.

In order to use the mobile terminal of the card holder as a disposable temporary card reader terminal, when calculation detail information in a store calculation terminal is transmitted to the mobile terminal, commercial-transaction related information such as calculation details is converted into a two-dimensional bar code in the store calculation terminal, the bar code is displayed on the display device of the calculation terminal, and then the displayed bar code is photographed using an application and a camera module built in the customer mobile terminal so that the calculation detail information is transmitted from the store calculation terminal to the mobile terminal of the mobile card holder, whereby the store calculation terminal and the mobile terminal of the card holder can easily transmit the calculation information without connection of wired and wireless communication.

In addition, in order to ensure the uniqueness of the calculation detail information provided in the form of a two-dimensional bar code and verify the validity of the calculation terminal generating calculation detail information and store information while preventing the image information having the provided calculation detail information from illegally being forged or falsified and reused, a two-dimensional bar code image is created by adding terminal ID assigned when registering the store calculation terminal with the credit card verifying service system in addition to calculation terminal OTP for verifying the validity of the calculation terminal or calculation terminal token information, in a step of converting the calculation detail information into a two-dimensional bar code type, and the credit card verifying service system extracts the calculation terminal OTP or calculation terminal token information transmitted by the store calculation terminal from card payment approval request information transmitted from the customer mobile terminal thereby verifying the validity.

Technical Solution

In a plastic card or mobile card payment in the related art, a card reader terminal with EMV/PCI certification is provided in a store to make a payment using a plastic card through the card reader terminal, or device such as NFC/RFID reader or the bar code scanner is connected to the card payment terminals with EMV/PCI certification for the purpose of the mobile card user and then the mobile terminal having the card information stored therein is brought close to the reader device so that the card information stored in the mobile terminal is transmitted to the card payment terminal to cause an approval request to be transmitted to the card payment system.

In such payment method using the card, when the card holder provides, to the card terminal installed in the store, the card number, card validity period, card issuing bank, and the like that are needed to approve the card payment, it is requested to approve the transaction to the bank server that issued the card through the card verifying service system in the card reader terminal of the store, and the payment is made on the basis of the approved result.

In a payment method using a mobile card in the related art, since the tokenized card information is used instead of the actual card information when making a card payment, there is a low likelihood that the actual card information and the personal financial information of the card holder are exposed to the outside. However, there is a difficulty in that, in order to fetch the card information (in this case, the mobile card token) from the mobile terminal of the card holder in which the mobile card is stored, a separate device such as an RFID/NFC reader or a bar code scanner has to be connected to the card reader and used, and furthermore the cost of the equipment will be borne by the store and card payment service company.

An object of the present invention is to provide a method of requesting a card payment approval and processing the approval using a mobile terminal of a mobile card holder, unlike a method of requesting a card payment approval through a plastic card reader terminal provided in a store in the related art. The present invention relates to a method and a system that enables making a mobile card payment using a mobile terminal of the mobile card holder, by which two-dimensional bar code image including information such as calculation details, store and calculation terminal unique information, and the like is displayed on a display device of a commercial calculation terminal operated by a store; the bar code image is photographed using a camera built in the mobile terminal having the purchaser mobile card stored therein; the calculation detail information and merchant and store calculation terminal information are extracted from the photographed bar code image; the extracted information, the mobile card information stored in the purchaser terminal, and card issuing bank information are collected and reconstructed in a data content type promised with the credit card verifying service system to transmit the resulting to the credit card verifying service system.

In order to achieve the above object, the present invention provides a payment service system using a mobile card, the payment service system including: a transaction calculation terminal used by a merchant to show customer transaction detail information to a customer; mobile terminal in which mobile card information of a card holder is stored; a credit card verifying service system that collects the payment approval request information from the mobile terminal of the card holder and verifies the validity of the transaction detail information issued by the merchant and the transaction calculation terminal used by the merchant and then transmits the payment approval request information to the payment network (VISA, MasterCard, etc.) and transmits a payment approval result from the payment network to the mobile terminal of the card holder and the merchant calculation terminal; a mobile card token service system that issues the mobile card token to the mobile card user and manages the validity of the mobile card token and a life cycle of the mobile card token; and a financial company that issues the card to the customer.

The transaction calculation terminal used by the merchant includes: means for securely storing the calculation terminal OTP information together with unique terminal ID information assigned to each calculation terminal from the credit card verifying service system at the step of registering with the card verifying service system; means for showing transaction details of the card holder to the mobile card holder through a display device built into the calculation terminal; and means for collecting the transaction detail information, the merchant and calculation terminal information, and the calculation terminal OTP information, converting the collected information into a two-dimensional bar code image, and showing the converted bar code image to the mobile card holder thorough the display device of the calculation terminal so that the mobile card holder may read the transaction detail information through a camera built in his/her mobile terminal.

According to another aspect of the present invention, a mobile terminal having a mobile card information of the card holder stored therein includes means that support a mobile calculation application provided by a mobile payment service provider, a camera sensor that supports an image capturing resolution enough for a two-dimensional bar code decoding application to decode the photographed image without errors when photographing the two-dimensional bar code image displayed on the merchant calculation terminal using a built-in camera module, and a terminal that extracts transaction information and store and calculation terminal information from the two-dimensional image, collects the card information of the card holder (the mobile card token in the present invention) together with the extracted information, and then transmits a payment approval request message to the credit card verifying service system.

According to another aspect of the present invention, the credit card verifying service system is located between the mobile terminal of the card holder and the card issuing bank server and preferably includes a function of extracting the merchant and the calculation terminal OTP information from the card payment approval request information received from the mobile terminal of the card holder, verifying the validity of the merchant that created the calculation information and store calculation terminal through verification of the extracted calculation terminal OTP information, and then transmitting the card payment approval request information to the card issuing bank server, and conversely, a function of transmitting a response sent by the card issuing bank server for the card payment approval request to the card holder and the merchant calculation terminal. Also, the method of verifying the validity of the calculation information generated by the calculation terminal is such that the calculation terminal OTP information and the terminal ID unique to each calculation terminal are assigned in a step of registering the calculation terminal with the card verifying service system, and the calculation terminal generates the 2D bar code including the calculation terminal OTP information when the calculation detail information is converted into the 2D bar code image, so that the calculation terminal OTP information assigned to the store calculation terminal is transmitted to the OTP system associated with the credit card verifying service system, thereby verifying the validities of the store calculation terminal and calculation information generated by the terminal by verifying the validity verification of the calculation terminal OTP information.

According to another aspect of the present invention, a step of registering the calculation terminal used by a merchant with the credit card verifying service system, in addition to terminal registration procedures with a merchant in the related art, includes a step of installing application with combination of a function of converting calculation information of the calculation terminal into two-dimensional code image and a function of the calculation terminal OTP to verify the validity and integrity of the calculation terminal and the calculation information, a step of allowing the card holder to acquire calculation information through a camera sensor built in a mobile terminal having his/her card information stored therein, by displaying the calculation detail image converted into a two-dimensional code image, together with the details capable of being read by the card holder, on a screen of the merchant calculation terminal when the card holder makes a payment request, and a step of checking the processing result of the payment approval request sent from the card verifying service system.

According to another aspect of the present invention, when the card holder makes payment using his/her mobile terminal and the mobile card stored in the mobile terminal, the mobile payment method includes a step of requesting a merchant to settle a payment, a step of performing mobile payment application associated with a mobile wallet after undergoing a user authentication process by inputting a biometric function such as fingerprint recognition, iris recognition, speech recognition, long text recognition, vein recognition, or the like and inputting a password, a step of photographing the two-dimensional bar code image displayed on the calculation terminal with a camera of the merchant mobile terminal after checking calculation detail displayed on the merchant calculation terminal, a step of extracting the transaction detail information and merchant and store calculation terminal information from the photographed bar code image and collecting the extracted information and mobile card information stored in the purchaser mobile terminal to transmit a payment approval request to the card verifying service system, and a step of checking a processing result of the payment approval request sent by the credit card verifying service system.

According to still another aspect of the present invention, when the credit card verifying service system registers the calculation terminal operated by the store, a mobile payment method includes: a step of assigning the calculation terminal OTP information for verifying the validity of the calculation terminal together with terminal ID information unique to each terminal; a step of extracting the calculation terminal OTP information included in the mobile card payment approval request information that is sent by the customer mobile terminal and verifying the validity of the merchant calculation terminal by verifying the extracted calculation terminal OTP; a step of transmitting the card payment approval request information that has passed the verification to a card network or a bank server issuing the card owned by the mobile card holder; and a step of transmitting a response of the card network or the card issuing bank server to the mobile card payment approval request, to the merchant calculation terminal and the mobile terminal of the card holder.

Advantageous Effects

According to a card payment approval request and calculation processing method using a mobile terminal of a mobile card holder of the present invention, when exchanging information needed to make a payment between a calculation terminal operated by a merchant and a mobile terminal of a mobile card holder, information necessary for payment can be transmitted conveniently and safely only by photographing a two-dimensional bar code displayed on a display device of the calculation terminal operated by the merchant using a camera module built in the mobile terminal of the card holder without wired and wireless data communication between the merchant calculation terminal and the mobile card holder's mobile terminal, and finally a mobile card payment approval request is achieved using the mobile terminal of the mobile card holder, whereby it is possible to improve convenience of using a mobile payment service through easy and safe payment without the card information of the mobile card holder being exposed to the outside other than the card payment service system.

In addition, according to another aspect of the present invention, although devices such as NFC/RFID reader, bar code reader, and the like have to be provided in addition to a card reader terminal with EMV/PCI authentication in order to make a mobile payment in a mobile card payment environment of the related art, the mobile payment environment according to the present invention is such that any computer or mobile terminal can be used as a mobile card payment terminal that is capable of creating calculation information and converting the same into a two-dimension bar code and thus displaying the result obtained by photographing the bar code using a camera of the card holder's mobile terminal, whereby that the business burden of a small-scale business, especially small-sized businesses, can be expected to be relieved. In addition, it can be expected that the card payment service providers have less burden of supplying expensive card reader terminals having ENV/PCI authentication.

As described above, according to the present invention, it is possible to solve the safety problem of a calculation method using a plastic card in the related art, and it is possible to reduce a store or credit card company's investment burden of adding a new device to use the mobile card, thereby facilitating the mobile card transaction.

MODE FOR INVENTION

Hereinafter, the configuration of the present invention will be described in detail with reference to the accompanying drawings. However, it goes without saying that the present invention is not limited to the embodiments described, but may be embodied in other forms.

Figure 1:
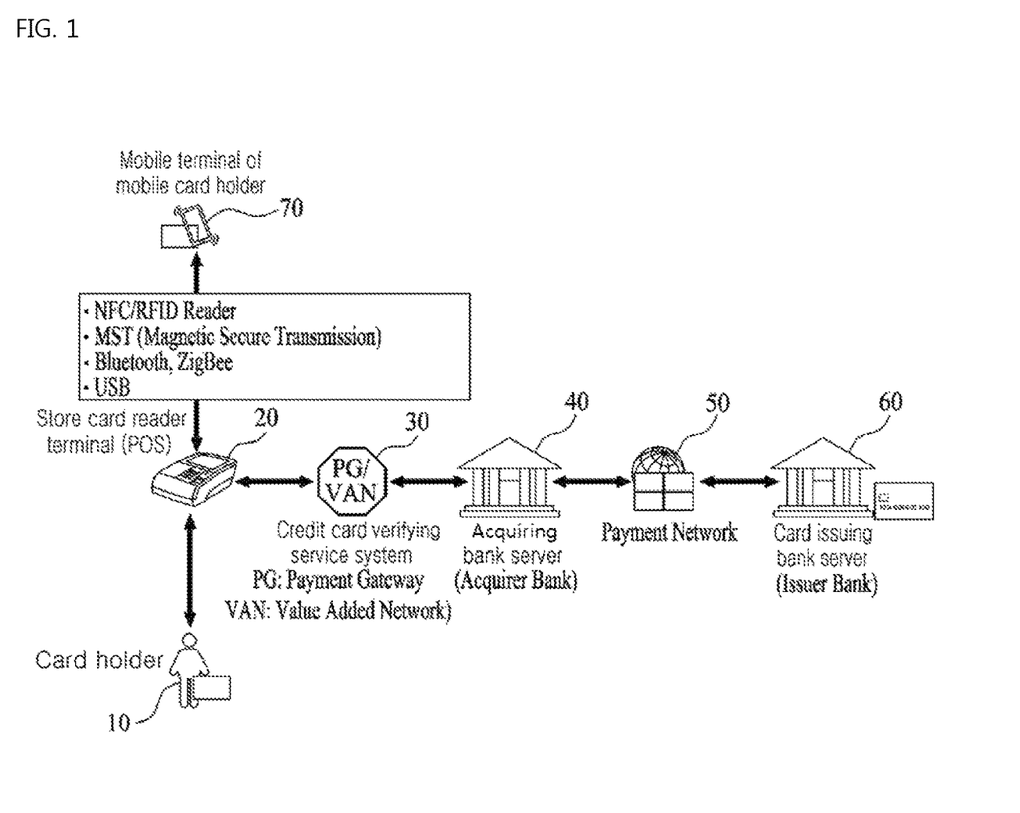
FIG. 1 is a block diagram showing a payment processing procedure using a card payment reader in a store using a general plastic card or mobile card.

FIG. 1 is a block diagram showing a payment processing procedure using a card payment reader in a store using a general plastic card or mobile card in a card payment environment in the related art.

Referring to FIG. 1, the plastic card holder 10 or the mobile card holder 70 owns a card issued by a credit card company. The store owner joins a particular credit card verifying service system 30 as a member, and has a common card reader terminal 20 for transmitting payment information. It is common that the card reader terminal 20 and the card verifying service system 30 are connected to each other via a wired and wireless communication network and connected to the credit card verifying service system 30 and bank servers 40 and 60 through a network with communication security.

When the card holder tries to make a payment by presenting his/her plastic card or a mobile terminal 70 having mobile card stored therein to the store, the plastic card presented by the card holder is inserted into a card reader slot, or the card holder's terminal is brought close to an RFID/NFC reader or a bar code reader in the case of a mobile card, in order to make a request for a payment approval to the card issuing bank server. In this case, the card reader terminal transmits information of the card holder stored in the card holder's card, transaction information generated in the card reader terminal, payment amount, and store information to the card verifying service system 30.

The card verifying service system 30 receiving the payment approval request data transmits transaction approval request data to an acquirer bank server 40, which is a transaction bank of the store.

The acquirer bank server 40 transmits the received transaction approval request data to a payment network 50, and the payment network 50 transmits the same to a card issuing bank server 60 again. The card issuing bank server 60 determines whether or not the transaction has been approved on the basis of the received card transaction approval request data and the card holder account information and then transmits the result to the store card reader terminal 20 via a path through which the transaction approval request data is transmitted, thereby complete the commercial transaction using the card.

Figure 2:
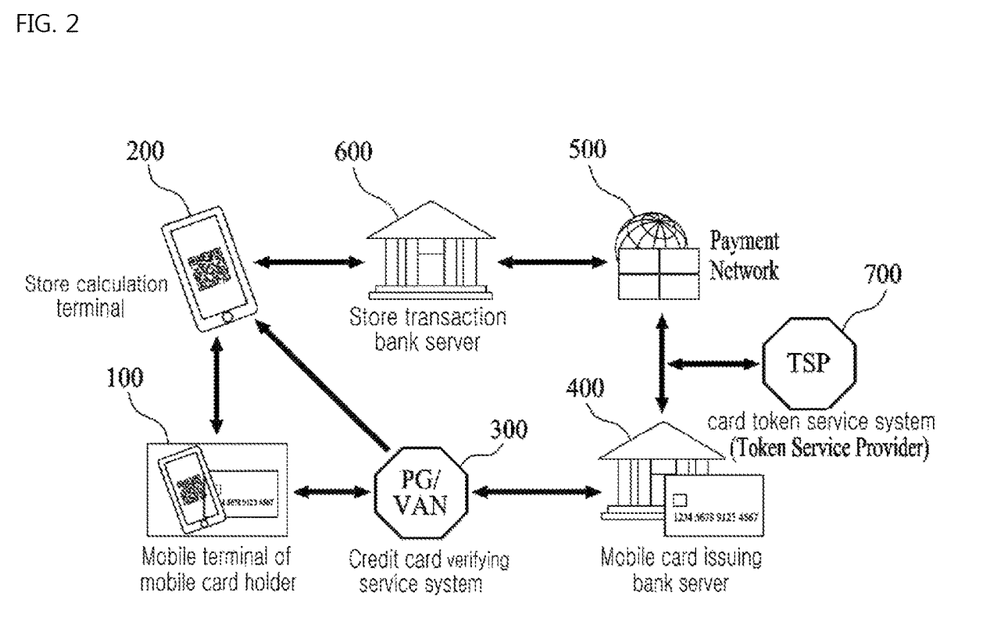
FIG. 2 is a block diagram illustrating a mobile card payment service according to an embodiment of the present invention.

FIG. 2 is a block diagram illustrating a mobile card payment service according to an embodiment of the present invention.

Referring to FIG. 2, when the mobile card holder 100 makes a request for a mobile card payment using his/her own mobile terminal to a store, the store collects information, such as store and terminal ID, calculation terminal OTP information, and the like given from the card verifying service system 300, together with calculation details and converts the collected information into bar code image, thereby displaying the converted image on a display device of the store calculation terminal 200. The mobile card holder photographs the image displayed on the calculation terminal 200 using a camera built in his/her mobile terminal; extracts calculation detail information, store and calculation terminal information, and calculation terminal OTP information from the photographed image; collects the extracted information and his/her tokenized mobile card information to construct a payment approval request message; and transmits the same to the card verifying service system 300. The credit card verifying service system 300 extracts the calculation terminal OTP information from the payment approval request message received from the card holder's mobile terminal, transmits the same to the OTP verification system of the card verifying service system 300 to verify whether or not there is the validity of the OTP information, and then transmits the payment approval request message that has passed the verification to the bank server 400 that issued the mobile card. The bank server 400 issuing the mobile card sends the mobile card token to the card token service system 700 to make a request for check on the integrity of the card token. When the integrity of the mobile card token is verified, the card token service system 700 provides the card issuing bank server 400 with information such as the primary account number (PAN) of the mobile card holder that the card-issuing bank server 400 needs to approve the card payment. The mobile card issuing bank server 400 determines whether or not to approve the mobile card payment request on the basis of the PAN information received from the card token service system 700 and then transmits the payment approval request result back to the card verifying service system 300. The card verifying service system 300 sends the received payment approval request result to the mobile terminal 100 in which the mobile card is stored and the calculation terminal 200. In addition, the card issuing bank server 400 informs the store transaction bank server 600 of the card approval processing result via the payment network 500 or in a direct way.

Figure 3:
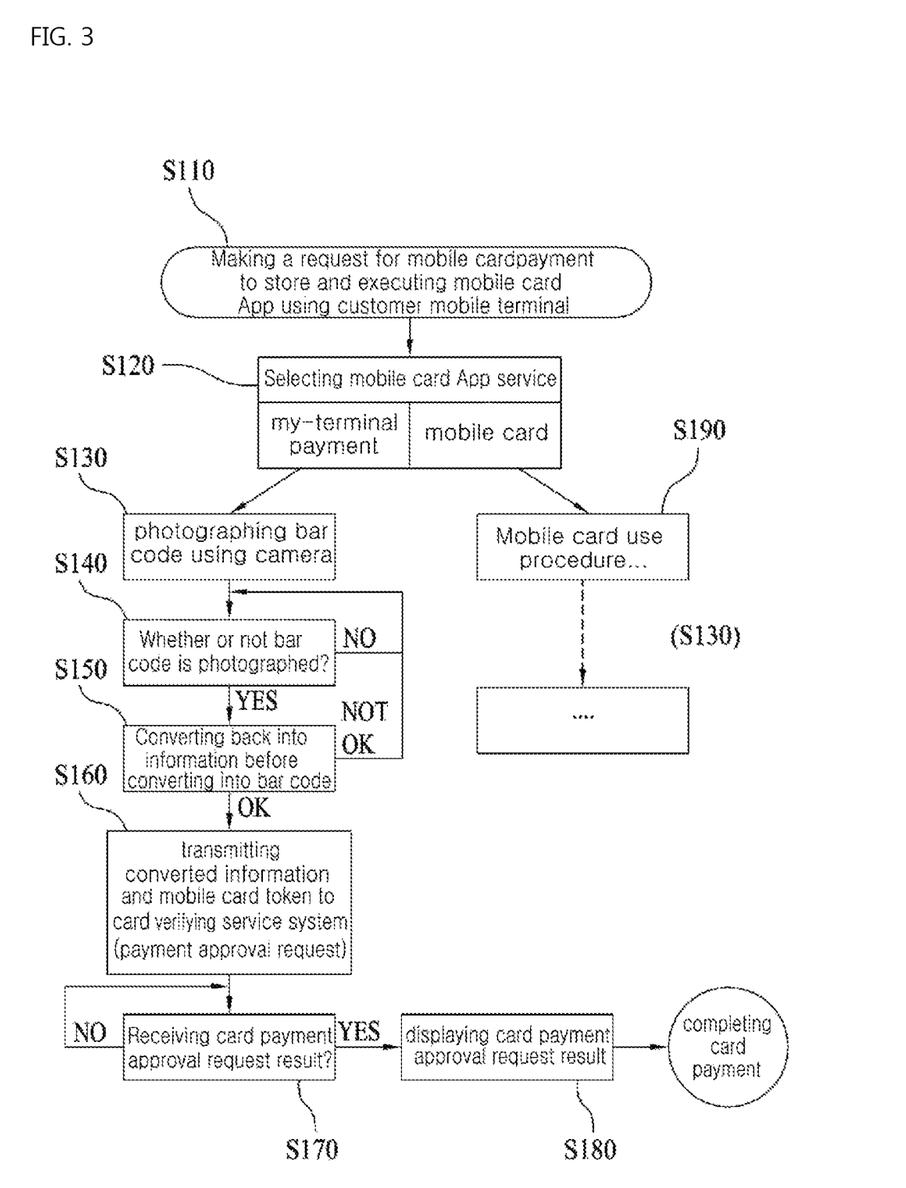
FIG. 3 is a block diagram illustrating a card payment operation in a mobile terminal of a mobile card holder according to an embodiment of the present invention.

FIG. 3 is a block diagram illustrating a card payment operation in a mobile terminal of a mobile card holder according to an embodiment of the present invention.

Referring to FIG. 3, when the card holder 100 who stores a card issued from a bank or a card service company in the form of a mobile card, makes a request for the mobile card payment to a store using his/her own mobile terminal (S110), the store shows, through a display device built in the calculation terminal 200, an image obtained by collecting transaction detail information and merchant and calculation terminal registration unique information, calculation terminal validation token, and the like, and converting the same into a two-dimensional bar code. In this case, the mobile card holder undergoes a mobile terminal user authentication using a biometric authentication or a password required by the mobile terminal or the mobile card application to execute a mobile card application (S110), selects a my-mobile payment menu (S120), photographs the camera image (S130) shown on a screen of the mobile terminal while being focused on a bar code image displayed at the store calculation terminal (S140), finally checks the calculation detail from the information converted back from the photographed image (S150), collects information such as the calculation information, the store calculation terminal information, the tokenized mobile card, and the like to construct card payment approval request data and transmit the same to the card verifying service system (S160), and then waits for a response to the transmitted payment approval request (S170). Herein, upon receiving the response of the payment approval request, the approval result is displayed on the display device of the mobile terminal (S180) and then the payment process is terminated. The my-mobile payment (S120) is arbitrarily named in order to easily distinguish the use of the existing mobile card from the method used in the present invention when explaining each step of the block diagram.

Meanwhile, a method and a procedure of generating a mobile card in a mobile terminal of a purchaser, a method of safely storing the generated mobile card in a mobile terminal, and a method of accessing and using stored mobile card information from a mobile application are varied depending on banks providing mobile card service or mobile card payment service business or mobile terminal, and the like, and the description thereof is not included in the scope of the present invention and thus omitted.

Figure 4:
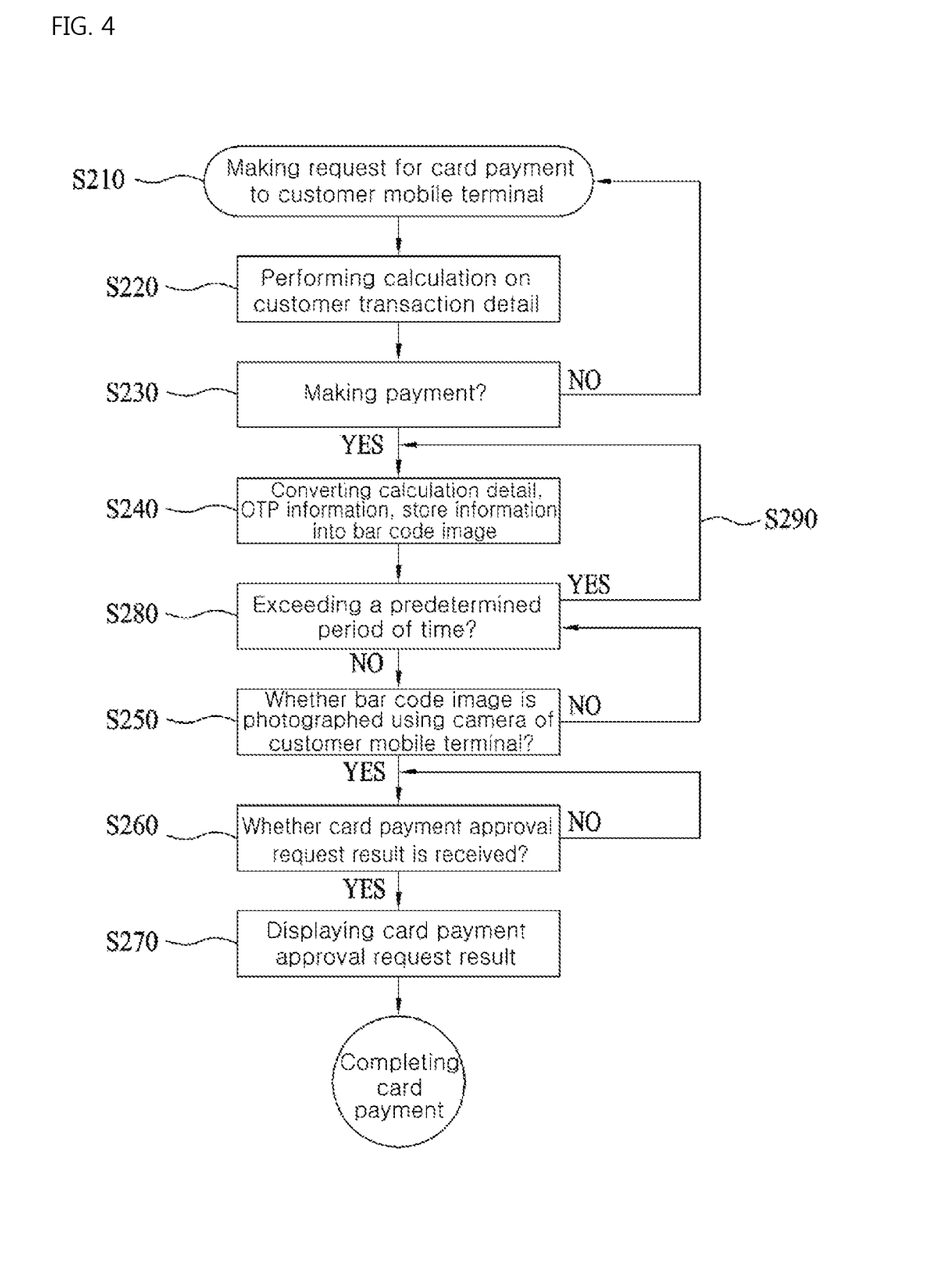
FIG. 4 is a block diagram illustrating an operation for supporting a mobile card payment in a store calculation terminal according to an embodiment of the present invention.

FIG. 4 is a block diagram illustrating an operation for supporting a mobile card payment in a store calculation terminal according to an embodiment of the present invention.

Referring to FIG. 4, when the card holder 100 having a mobile card issued by a card company stored in a mobile terminal makes a request for a mobile card payment using the mobile terminal to a store (S210), the store shows the calculation detail to the card holder (S220) and checks whether the payment is processed or not (S230). When the card holder approves the payment process, the calculation details and the calculation terminal information are converted into a two-dimensional bar code image, and the converted image is displayed on a display device of the calculation terminal (S240). The mobile card holder executes the mobile card application and then photographs the bar code image displayed on the store calculation terminal using a camera built in the mobile terminal (S250). Then, the mobile card holder transmits a card payment approval request and waits for a result reception for the approval request (S260). When exceeding a predetermined period of time to show the calculation details with bar code image to the mobile card holder (S280), the bar code image is newly created (S290), which is a method of verifying the validity of the store or the store calculation terminal. This is because the calculation terminal OTP information whose value changes according to the predetermined period of time is used to make a bar code image. When the result of the payment approval request is received, the approval result is displayed on the display device of the calculation terminal (S270), and then the payment process is terminated.

Figure 5:
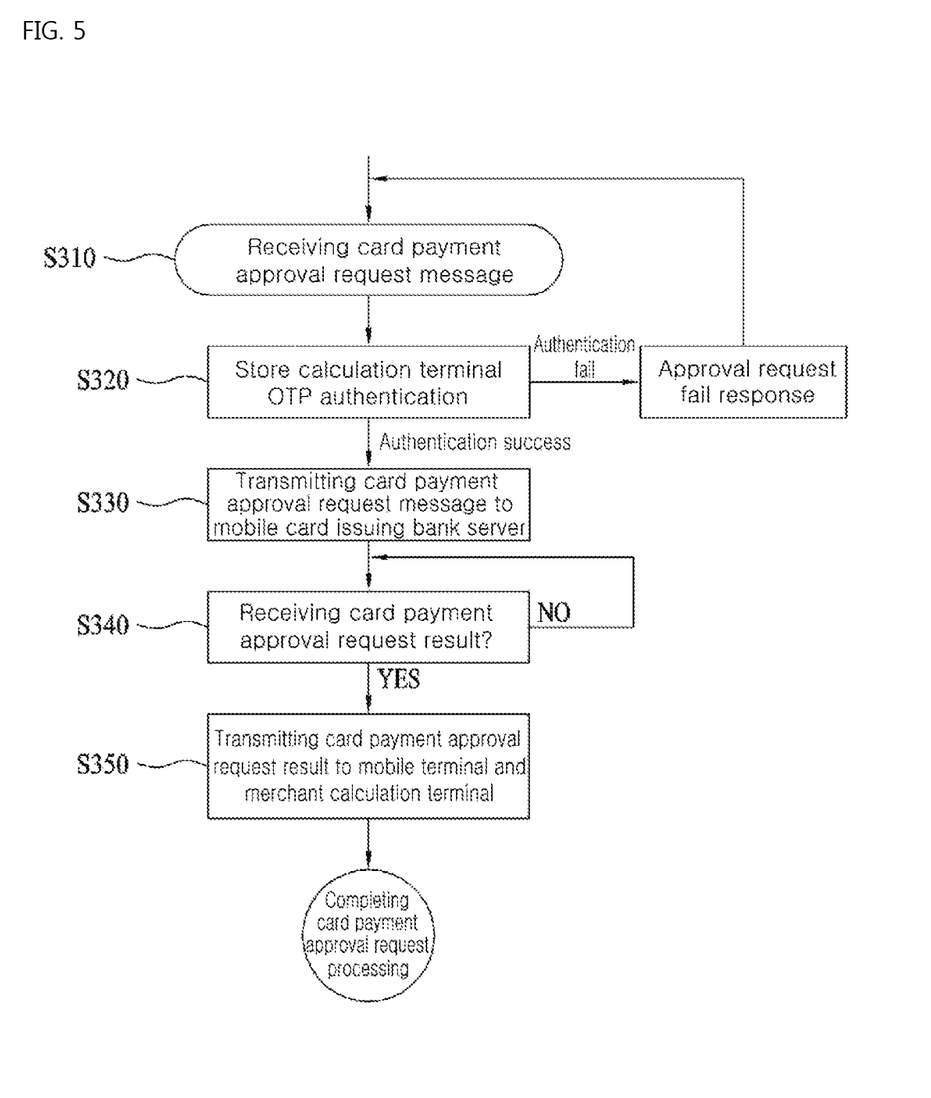
FIG. 5 is a block diagram illustrating a credit card verifying service system according to an embodiment of the present invention.

FIG. 5 is a block diagram illustrating a credit card verifying service system according to an embodiment of the present invention.

Referring to FIG. 5, when the card verifying service system 300 receives the card payment approval request from the mobile terminal 100 of the mobile card user (S310), the card verifying service system 300 verifies the validity of the store calculation terminal creating the calculation information and the store calculation terminal through inspection of the calculation terminal OTP information included in the received request information (S320), and transmits the calculation approval request information and tokenized mobile card information to the mobile bank issuing bank server 400 when passing the verification (S330), and then waits for a result of an approval request from the mobile card issuing bank server 400. Upon receiving the processing result for the approval request from the mobile bank issuing bank server 400, the card verifying service system 300 transmits the same to the mobile terminal 100 having the mobile card stored therein and the merchant calculation terminal 200 (S350) and thus notifies of the card payment approval request result.

Figure 6:
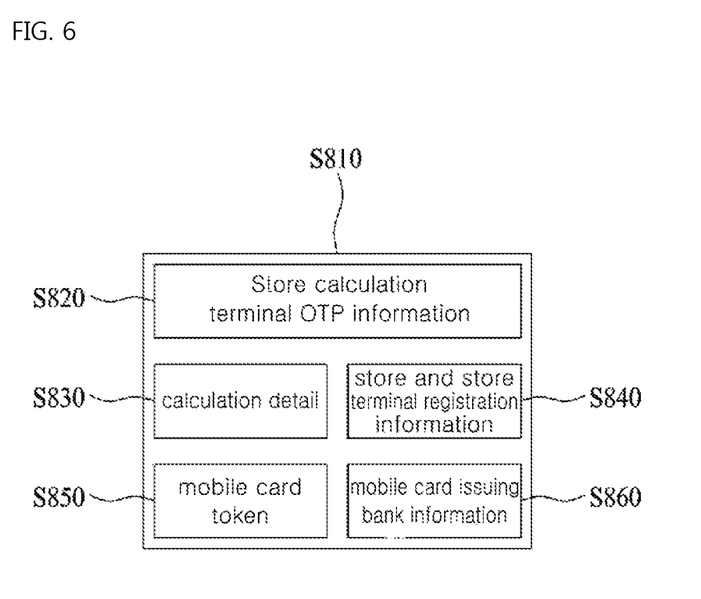
FIG. 6 is a block diagram illustrating a configuration of a card payment approval request message sent from a mobile terminal of a mobile card holder to a credit card verifying service system according to an embodiment of the present invention.

FIG. 6 is a block diagram illustrating a configuration of a card payment approval request message sent from a mobile terminal 100 of a mobile card holder to a credit card verifying service system 300 according to an embodiment of the present invention.

Referring to FIG. 6, when establishing a card payment approval request message (S810) to be transmitted from the mobile card holder's mobile terminal 100 to the card verifying service system 300, the card payment approval request message (S810) includes the calculation terminal OTP information (S820) capable of verifying the validity of the store or the store calculation terminal, the tokenized mobile card (S850), and mobile card issuing bank information S860 that allows the credit card verifying service system 300 to transmit the card payment approval request message S810 directly to the mobile card issuing bank server 400.

Figure 7:
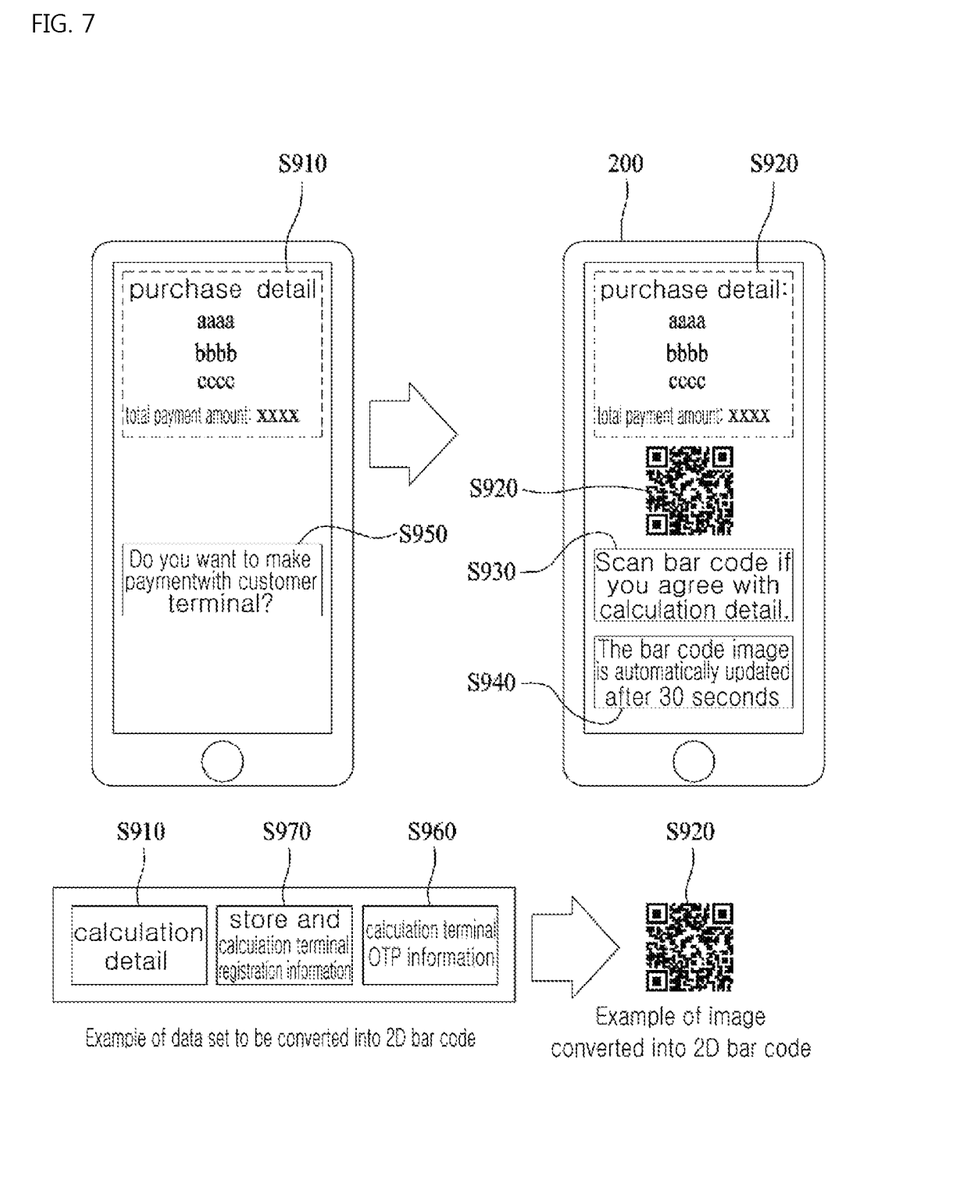
FIG. 7 is a block diagram illustrating a user interface for showing calculation information converted into a bar code form in a store calculation terminal to a mobile card holder according to an embodiment of the present invention.

FIG. 7 is a block diagram illustrating a user interface for showing calculation information converted into a bar code form in a store calculation terminal to a mobile card holder according to an embodiment of the present invention.

Referring to FIG. 7, as the calculation terminal of the store receives a payment request from the customer mobile card, the calculation terminal displays the customer transaction details (S910) on the display device of the calculation terminal and asks the mobile terminal having the customer mobile card therein whether the card payment approval request is processed or not (S950). When the mobile card holder approves the use of his/her own mobile terminal, the calculation details are displayed as an image converted into a bar code (S920), and the store calculation terminal displays a bar code usage guide message (S930) (S940). When converting the calculation information into the bar code image at the store calculation terminal, the calculation terminal converts data obtained by collecting the purchase detail information (S910) and store calculation terminal registration information (S970) such as terminal ID, and the calculation terminal OTP information S960 assigned to the calculation terminal, into bar code image, and then display the converted bar code image on the display device 200 of the calculation terminal (S920). However, the use of OTP is not the only way to validate the store and the store calculation terminal, and thus other means may be used in accordance with the policies of the card payment service provider.

Figure 8:
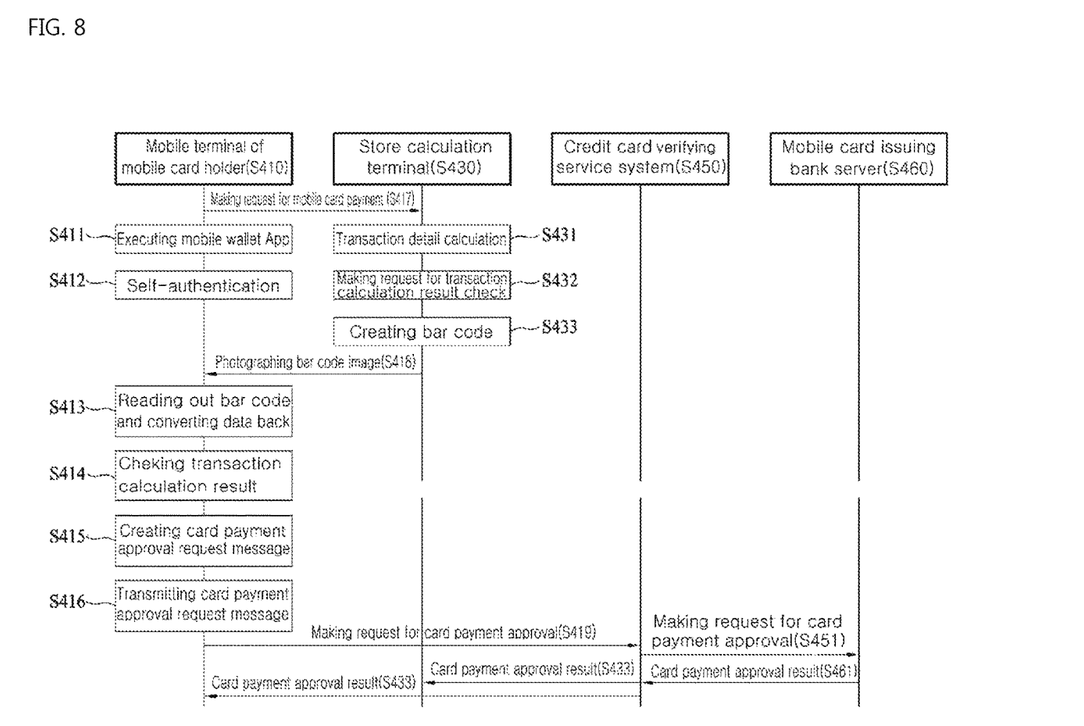
FIG. 8 is a block diagram illustrating a payment process using a mobile card according to an embodiment of the present invention.

FIG. 8 is a block diagram illustrating a payment process using a mobile card according to an embodiment of the present invention.

Referring to FIG. 8, when the mobile card holder (S410) make a request for payment to the store (S430) using his/her own mobile card, the store performs the purchase details calculation (S431) and allows the customer to check the calculation details (S432). When the customer does not make objections to the calculation details, the store creates a bar code (S433). The mobile card holder executes the mobile wallet application having the mobile card stored therein (S411), and then performs self-authentication (S412). At this step, depending on the development of the mobile wallet application, the self-authentication step may be needed prior to authentication of the mobile wallet application. When the mobile wallet application is carried out, a camera photographing function may be automatically performed in such a manner as to automatically read the bar code. After checking the transaction details provided by the store through bar code image photographing function (S418) and reading-out function (S413) built in the mobile wallet application at the customer mobile terminal (S415), as illustrated in FIG. 6, payment approval request data is constructed (S415) and then transmitted to the card verifying service system S450 (S416) (S419). The card verifying service system (S450) verifies the validity of the store and the calculation terminal by extracting the calculation terminal OTP information included in the received payment approval request data and verifying the validity of the extracted OTP information, transmits the calculation details and tokenized mobile card to the mobile card issuing bank server S460 when passing the validity verification (S450), and then waits for a result of the payment approval request from the card issuing bank server (S460). Upon receiving a response to the approval request from the card issuing bank server S460 (S461), the card verifying service system transmits the response back to the mobile terminal S410 in which the mobile card is used and the merchant calculation terminal S430 (S433).

While the present invention has been particularly shown and described with reference to exemplary embodiments thereof, it will be understood by those skilled in the art that various changes and modifications may be made without departing from the scope of the present invention.

Also, the scope of the present invention should not be limited to the embodiments described in this specification, and the scope of protection of the present invention should be defined by the description of the following claims.

The invention claimed is:

1. A mobile card payment service system providing mobile payment service using a customer mobile card and a mobile terminal, the system comprising:
   a card token service system creating a card token corresponding to a mobile card to provide the same to a mobile card holder according to a request of the mobile card holder and verifying the card token sent by a bank server to provide a primary account number (PAN) corresponding to the card token to a bank when passing the verification;
   a card issuing bank server issuing the mobile card to a bank customer in accordance with a request of the bank customer;
   a payment network connecting the card issuing bank servers and acquiring bank servers to each other;
   a credit card verifying service system including a function of assigning calculation terminal One Time Password (OTP) information for verifying the validity of the calculation terminal and information created by the calculation terminal together with terminal ID of calculation terminal identification information, to each of calculation terminals registered in the credit card verifying service system, when registering a store calculation terminal for the use of mobile card payment service, a function of extracting the calculation terminal OTP information included in a card payment approval request message transmitted from the customer mobile terminal and verifying the validity of the extracted calculation terminal OTP information when processing the card payment approval request message, a function of transmitting the card payment approval request message to the mobile card issuing bank server when passing the validity verification of the calculation terminal OTP information, and a function of transmitting a card payment approval request result received from the mobile card issuing server to the mobile terminal of the card holder and the store calculation terminal;
   the store calculation terminal including a function of collecting customer transaction detail information, store information and the terminal ID of calculation terminal identification information assigned when being registered in the credit card verifying service system, the calculation terminal authentication OTP information, converting the collected information into a two-dimensional bar code image, and displaying the converted image on a display device of the calculation terminal, and a function of receiving the mobile card payment approval request result from the credit card verifying service system, when the store receives a card payment request using the customer mobile terminal; and the customer mobile terminal including a function of executing a mobile application in which the card token of the customer mobile is stored, to photograph bar code information displayed on the display device of the store calculation terminal using a camera, to convert the photographed image information back into data collected by the calculation terminal, to collect the converted information, customer mobile card information, and mobile card issuing bank information to construct the mobile card payment approval request message and transmit the same to the credit card verifying service system, and to receive the mobile card payment approval request result from the credit card verifying service system.

2. The system of claim 1, wherein the store calculation terminal collects customer commerce transaction details, the store information and the terminal ID of calculation terminal assigned from the credit card verifying service system, and the calculation terminal OTP information, converts the collected information into a two-dimensional bar code, and then displays the same on the display device of the calculation terminal, without conjunction with an external system when initiating a card payment with the customer mobile terminal.

3. The system of claim 1, wherein the customer mobile terminal is provided, when initiating a card payment using the customer mobile terminal, such that an application is operated in such a manner to use the mobile card issued from a card issuing company, the two-dimensional bar code image displayed on the display device of the store calculation terminal is photographed using a camera built in the mobile terminal, the commerce-transaction details, the terminal ID, and the calculation terminal OTP information are extracted from the photographed two-dimensional bar code image, the extracted information and the customer mobile card information, the mobile card issuing bank information, and the like are collected to construct the card payment approval request message, and the card payment approval request message is transmitted to the credit card verifying service system.

4. The system of claim 1, wherein the credit card verifying service system is provided, in a step of registering the store calculation terminal for the use of the mobile card calculation terminal, such that the calculation OTP information capable of verifying the validity of the terminal ID of calculation terminal identification information and the calculation terminal is assigned to the calculation terminal, the calculation terminal OTP information included in the card payment approval request message that is transmitted from the customer mobile terminal is extracted, the extracted calculation terminal OTP information is transmitted to the OTP system of the credit card verifying service system so that the validity verification of the extracted OTP information is performed, the card payment approval request message is transmitted to the card issuing bank server when passing the validity verification of the calculation terminal OTP information, and a processing result for the card payment approval request received by the mobile card issuing bank server is transmitted to the customer mobile terminal and the store calculation terminal.

5. A mobile card payment method using a customer mobile card and a mobile terminal, the method comprising:

creating, by a card token service system, a mobile card token in accordance with a request of a mobile card holder and transmitting the created mobile card token to the card holder;

assigning, by a credit card verifying service system, calculation terminal authentication OTP information together with store-unique information and terminal ID in a step of registering a store calculation terminal;

collecting, by a merchant, customer commerce transaction detail, calculation terminal ID, store information, and store calculation terminal OTP information and converting the collected information into a two-dimensional bar code to display the result on a display device of the store calculation terminal when a merchant receives a mobile card payment request using the customer mobile terminal;

executing, by a customer, a mobile card application having the mobile card stored therein using the customer terminal and photographing the two-dimensional bar code image displayed on the store calculation terminal using a camera to acquire image information;

converting, by the mobile card application of the customer terminal, the image information acquired through the camera photographing back into the original information collected by the store calculation terminal;

collecting, by the mobile card application of the customer terminal, the converted information and customer mobile card information, and mobile card issuing bank information to construct a card payment approval request message and transmit the constructed message to the credit card verifying service system;

extracting, by the credit card verifying service system, the store calculation terminal OTP information included in the card payment approval request message that is transmitted from the customer mobile terminal and performing the validity verification on the extracted calculation terminal OTP information to verify the store calculation terminal;

transmitting, by the credit card verifying service system, the card payment approval request message to the mobile card issuing bank server when passing the validity verification on the calculation terminal OTP information transmitting, by the mobile card issuing bank server, the mobile card token included in the card payment approval request message that is transmitted by the credit card verifying service system to a card token service system to make a request for verification of the mobile card token performing, by the card token service system, verification on the mobile card token that is transmitted from the mobile card issuing bank server and transmitting verification result information to the mobile card issuing bank server;

processing, by the mobile card issuing bank server, the card payment approval request in accordance with the verification result information that is transmitted by the card token service system and transmitting the result to the credit card verifying service system; and transmitting, by the credit card verifying service system, the result for the card payment approval request that is transmitted by the mobile card issuing bank server to the customer mobile terminal and the store calculation terminal.

* * * * *